UNITED STATES PATENT OFFICE.

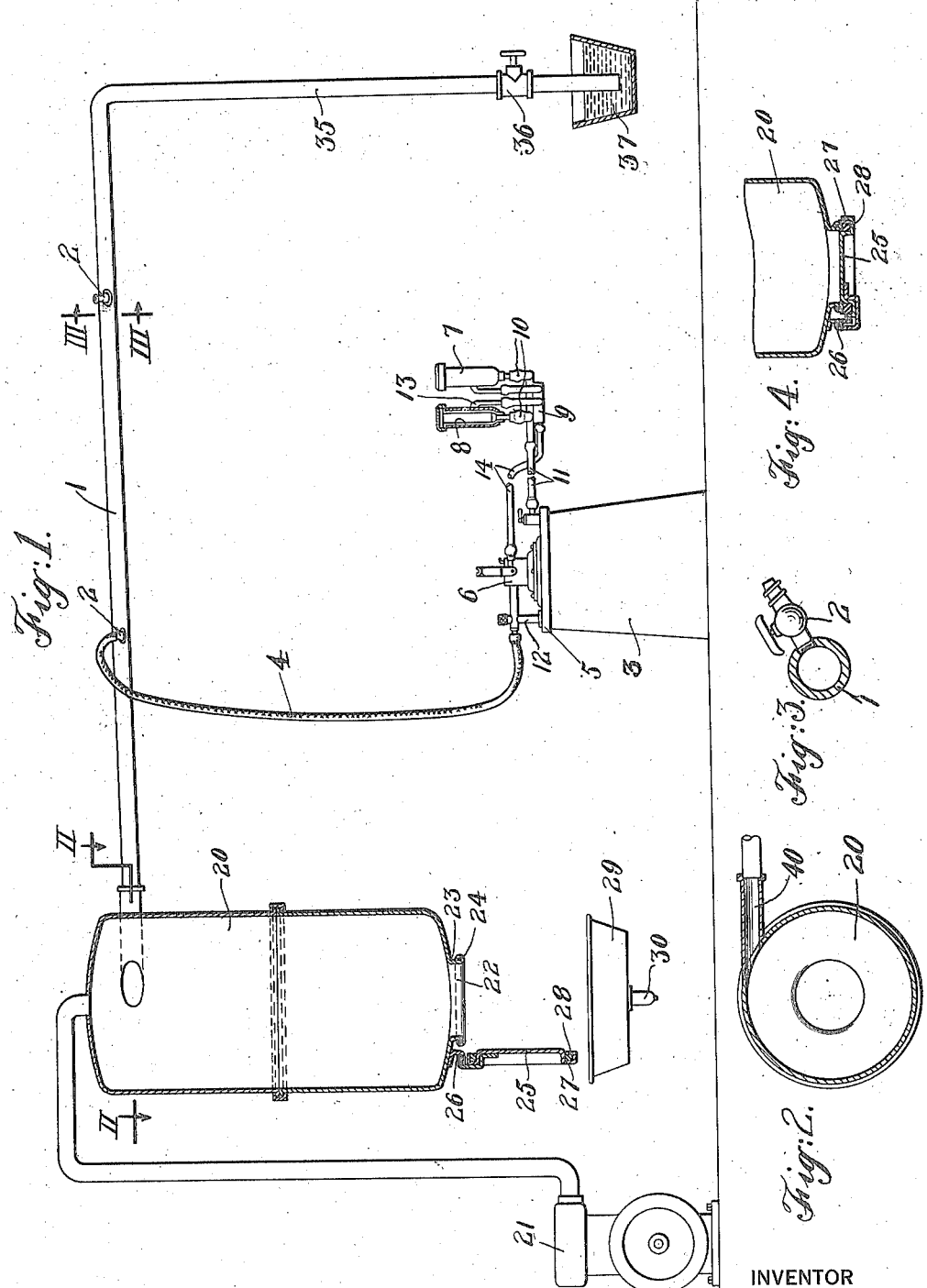

HERBERT McCORNACK, OF GLEN RIDGE, NEW JERSEY, ASSIGNOR TO EMPIRE CREAM SEPARATOR COMPANY, OF BLOOMFIELD, NEW JERSEY, A CORPORATION OF NEW JERSEY.

MILKING-MACHINE SYSTEM.

1,393,387.

Specification of Letters Patent.   Patented Oct. 11, 1921.

Application filed February 7, 1918.   Serial No. 215,775.

*To all whom it may concern:*

Be it known that I, HERBERT McCORNACK, a citizen of the United States, residing at Glen Ridge, county of Essex, and State of New Jersey, have invented certain new and useful Improvements in Milking-Machine Systems, of which the following is a specification.

This invention relates to cow milking machinery and particularly to improvements in the construction of vacuum systems and vacuum tanks or reservoirs for use in connection with milking apparatus. In the use of all milking devices one of the most important considerations is that of sanitation, it being absolutely essential to eliminate as far as possible every condition tending to promote the development of bacteria. As the presence of any milk remaining in the apparatus is obviously conducive to the generation of bacteria, thorough washing and flushing out of the apparatus is of foremost importance in maintaining satisfactory conditions. In milking apparatus as at present utilized it is customary to wash out the teat cups, milk pipes and other parts through which the milk actually flows but no provision has been made for flushing out the vacuum main, reservoir and other parts of the apparatus with which the milk does not normally come in direct contact. It is nevertheless true, however, that owing to leakage, condensation of the milk vapor and other causes appreciable quantities of milk will find their way through the vacuum system, which if permitted to accumulate shortly become a breeding ground for bacteria and seriously menace the sanitary condition of the entire system.

The principal object of the present invention is to provide a system which may be quickly and thoroughly flushed and in which provision is made for draining out all condensation or leakage finding its way into the vacuum system or tank. This drainage preferably takes place automatically so that even the carelessness of the operator cannot permit objectionalble matter to accumulate in the system. The nature and various specific objects of the invention will appear more clearly from the following description of one specific form of apparatus which I have chosen to illustrate the principle of the invention and the best mode now known to me for performing the same.

In the accompanying drawing which illustrates such apparatus, Figure 1 is a diagrammatic view showing a system embodying a vacuum pump, a tank or vacuum reservoir and a pipe line or vacuum main extending through the stable or milking room, milking unit being shown attached to one of the stall cocks in the pipe line or vacuum main.

Fig. 2 is a horizontal section through the tank taken on line II—II of Fig. 1.

Fig. 3 is a section through the vacuum main taken on line III—III of Fig. 1.

Fig. 4 is a vertical section of the lower end of the tank showing the door closed.

Referring to the drawings in detail the numeral 1 designates a pipe line or vacuum main which is extended through the cow stable in which the cows are stalled when being milked. This pipe line is provided at suitable intervals with stall cocks 2, two of which only are illustrated. 3 is a milking unit which is arranged to be connected with a convenient one of the stall cocks by means of a pipe 4 preferably of rubber tubing or other flexible material. The milking unit 3 may be of any suitable construction, that shown comprising a milk pail having mounted thereon a lid 5 carrying a pulsator 6. 7 are the teat cups which in the specific form of apparatus shown are of the two chambered type having flexible linings or inflations 8 usually of rubber, the inner chambers formed by the linings being connected with one member of the claw 9 by means of tubes 10. This member of the claw is connected to the milk cock on the pail lid by the milk pipe 11. Suction is maintained within the milk pail through a connection 12 from the vacuum pipe 4 so that the milk is drawn from the teats into the inner chambers of the teat cups and passes through the pipes 10 and 11 to the pail. The outer chambers of the teat cups formed between the outer casings thereof and the linings are connected by the pulsation pipes 13 with a separate passage in the claw which is connected by the pipe 14 to the pulsator 6 which is actuated by the vacuum and produces intermittent pulsations of pressure and vacuum in the outer chambers of the cups in a well understood manner. In apparatus of this character the milk is supposed to pass only from the inner chambers of the teat cups through the pipes named to the pail where it is collected, no milk being intended to pass through the pulsator or through the pipe 4 to the vacuum main. In many instances, however, this condition does not obtain as a certain amount of milk vapor is drawn through the connection 12 into the pipe 4 and passes through the latter into the vacuum main 1 where it may condense. There is also the possibility of the rubber linings in the teat cups becoming punctured or breaking, thereby permitting some of the milk to pass through the pipes 13 and 14 and the pulsator 6 into the pipe 4 and vacuum main 1. Also, should the milk pail be permitted to become too full, the milk might be drawn through the connection 12 into the vacuum pipes. From one or the other of these causes, it is, however, a fact that it is not at all uncommon for more or less milk to pass through the pipe 4 into the vacuum main and other parts of the vacuum system.

The pipe 1 is connected at one end with a source of vacuum usually in the form of a tank or reservoir 20 which is exhausted by means of some form of vacuum pump such as that illustrated diagrammatically at 21. This pump is operated whenever the milking is taking place and maintains the desired degree of vacuum in the tank which acts as a reservoir so as to equalize the vacuum insure uniform operation of the milking devices. Owing to the causes above explained which permit milk or milk vapor to find its way into the vacuum main 1, it will be seen that more or less of such milk will be drawn into the vacuum tank.

In accordance with my invention means are provided for drawing out the tank, and in order that no liquid shall accumulate in any other part of the vacuum system I preferably arrange the main 1 so that it has a slight pitch toward the vacuum tank so that any liquid finding its way into such main will flow into the tank. For a like reason I prefer to arrange the stall cocks so that they will drain downwardly into the main 1, this being accomplished by inclining the cocks upward as shown in Fig. 3. It will thus be seen that whatever liquid is in the vacuum system will drain into the tank. For the purpose of draining the tank I provide the latter with a suitable drain opening at the bottom thereof and in order to insure that the tank shall be drained after every operation of the milking apparatus I prefer to utilize as the closure for this opening a door which is maintained closed during the operation of the apparatus by the action of the vacuum within the tank so that when the pump is stopped after the milking is completed the door will automatically open and permit the draining to take place. In this way I avoid the possibility of draining being omitted by reason of the carelessness of the operator. In the construction illustrated the tank 20 is provided at its lower end with a large opening surrounded by a flange 23 which may be provided with a bead 24. A door 25 is hinged at the bottom of the tank at one side of this opening, as at 26, the door having an annular groove or seat 27 in which is a flexible packing such for instance as a rubber ring 28 which is adapted to fit against the bead 24 and form a tight joint when the door is closed. When there is milking to be done the operator starts the pump 21 and then with his hand presses the door 25 up against its seat and holds it there for a few moments while the pump exhausts the tank 20 until a sufficient vacuum is formed so that the pressure of the atmosphere will maintain the door in position with the ring 28 compressed tightly against the seat and this condition will be maintained as long as the pump is operated. As soon, however, as the pump is stopped and air is permitted to enter the vacuum system at any point, the vacuum in the tank will be quickly broken and the door will swing open to the position shown in Fig. 1, thereby permitting any liquid which has found its way into the tank to be at once discharged. If desired, a sink 29 and drain 30 may be provided to catch the discharge from the tank. Other constructions for insuring that the system shall be drained at proper intervals may be substituted for that described.

In addition to providing for the drainage of any liquid accumulating in the vacuum system it is desirable for reasons explained above to thoroughly flush out the vacuum system after each operation of the apparatus so as to remove any trace of milk or other organic matter. This may be done by permitting water to be drawn into the vacuum system and tank before the vacuum in the latter is broken. For instance, the pipe 4 may be permitted to remain attached to one of the stall cocks but be disconnected from the milking unit and dipped into a pail of water which will be sucked into the vacuum system through the stall cock. Preferably, however, I provide at the end of the vacuum main remote from the tank a flushing pipe 35 which is brought down to a convenient level and provided with a valve 36 by which it may be closed to permit the vacuum to be maintained in the system. When the operation of milking is completed and it is desired to flush the system, the end of the pipe 35 is immersed in a vessel 37 of water or suitable cleaning solution and the valve 36 opened, permitting the water to be sucked into and through the vacuum main and into the tank 20. Preferably before the valve 36 is opened the pump 21 will be stopped, the vacuum existing in the tank 20 being sufficient to draw the water into the system. When the vessel 37 is emptied air will follow the water up the pipe 35 and through the vacuum main 31, driving out all the water therein and finally reaching the tank 20 and breaking the vacuum in the latter. When this happens the door 25 will at once swing open thereby permitting all of the water and the impurities collected in the tank or washed out of the system by the water to discharge into the sink. The door then remains open until the next operation of milking, which permits the tank to be thoroughly dried and aired out thereby promoting the most sanitary conditions and tending to prevent rust or corrosion.

In order to provide for the most effective washing out of the tank I preferably provide a tangential inlet into the same from the vacuum main as illustrated particularly at 40 in Fig. 2, this inlet being located close to the top of the tank. In this way the water which is drawn through the piping for flushing the same will be delivered horizontally into the tank near the top thereof and close to the wall, this water being delivered with considerable force and thereby caused to swirl rapidly around inside of the tank so as to completely flush the surface thereof.

From the foregoing it will be seen that I provide a convenient means for thoroughly flushing out the vacuum system of a milking apparatus and for the draining out of any liquid which may find its way into the vacuum system or tank. I also provide for the automatic discharge from the vacuum tank of this drainage as well as of the water used for flushing the system, this emptying out of the tank being certainly accomplished at the conclusion of every milking without reliance on the care and attention of the operator. In this way the accumulation of objectionable drainage and particularly of organic matter likely to permit the multiplication of bacteria is entirely and automatically prevented.

While I have shown and described in detail but one preferred embodiment of my invention as illustrative of the principle thereof I am aware that the invention may be employed in various modified forms and that some features of the invention may be employed without others. The invention is also applicable to milking systems or various types other than that illustrated. I do not therefore intend to limit myself to the specific structure described but intend to cover my invention broadly in whatever form its principle may be embodied.

Having thus described my invention I claim:

1. In a milking system having teat cups, a milk-receiving vessel and connections therebetween, the combination of a vacuum reservoir and a vacuum main draining thereinto, said reservoir and main being independent of the milk-receiving parts of the system except for a vacuum connection therewith.

2. A milking system comprising the combination of teat cups, a milk-receiving vessel, connections therebetween, a vacuum reservoir, automatic means for draining the same, a vacuum main draining into said reservoir and a suction pipe connecting the milk-receiving vessel with said vacuum main.

3. A vacuum system for milking apparatus having draining means independent of the milk-receiving part of the apparatus, said draining means being held closed during the operation of the system by the action of the vacuum.

4. A vacuum system for milking apparatus, including a vacuum reservoir independent of the milk handling parts of the apparatus, and means for maintaining a continuous vacuum in said reservoir throughout the operation of the apparatus, said reservoir having a drain opening, and a closure for said opening adapted to be held closed by the vacuum in the reservoir and to open automatically when said vacuum is broken.

5. A vacuum system for milking apparatus, including a reservoir and a vacuum main independent of the milk-receiving parts of the apparatus, means for maintaining a vacuum in said reservoir throughout the operation of the apparatus, said reservoir having a door at the bottom thereof adapted to be held closed by the vacuum in said reservoir, but to open automatically when said vacuum is broken.

6. In a milking machine system the combination of a milking unit including teat cups, a milk receptacle and connections therebetween, a vacuum reservoir, a vacuum main connected therewith and inclined so as to drain thereinto, stall cocks attached to said main and arranged to drain thereinto and a suction pipe for connecting the milking unit with a stall cock.

7. In a milking system the combination of milk-extracting and receiving devices, a vacuum main adapted to be connected therewith or with a source of flushing fluid, a vacuum tank, and means for maintaining a vacuum in said tank, said vacuum main discharging tangentially into the upper part of the tank.

8. In a milking system the combination of milk-extracting and receiving devices, a vacuum main adapted to be connected therewith, a substantially vertical cylindrical vacuum tank having a tangential inlet near the upper end thereof with which said vacuum main is connected, said tank having a drain opening at the lower end thereof, a closure for said opening adapted to be maintained closed when there is a vacuum within the tank, and means for maintaining a vacuum within the tank during the operation of the apparatus.

9. In a milking system, the combination of a substantially vertical cylindrical vacuum tank, and a substantially horizontal vacuum main discharging tangentially into said tank near the upper end of the cylindrical side wall thereof, means for connecting said vacuum main to a source of flushing fluid, and means for maintaining a vacuum in said tank.

10. In a milking system, the combination of a vacuum tank and a vacuum main connected therewith at one end and adapted to be connected to the milk-extracting and receiving devices of the system, said main being connected at its other end with a downwardly extending flushing pipe provided with a valve for closing the same, said main being arranged to drain into said tank and being provided with stall cocks, said tank being provided with draining means.

11. In a milking system, the combination of a vacuum tank and a vacuum main discharging tangentially thereinto, said main having a flushing pipe connected therewith.

12. In a milking system, the combination of a vacuum tank and a vacuum main connected therewith at one end and adapted to be connected to the milk-extracting and receiving devices of the system, said main being connected at its other end with a flushing pipe, said tank being provided with draining means.

13. In a milking system, the combination of a vacuum tank and a vacuum main connected therewith at one end, said main being connected at the other end with a flushing pipe, said tank having a drain orifice at the bottom thereof provided with a closure adapted to be held closed so long as a vacuum is maintained in the tank but to open automatically upon the breaking of the vacuum.

HERBERT McCORNACK.